Jan. 29, 1924.    1,482,168
F. H. WALKLEY
WHEEL
Filed Oct. 25, 1922    2 Sheets-Sheet 1

Inventor
Frank H. Walkley,
By Toulmin & Toulmin
Attorneys

Jan. 29, 1924.  1,482,168

F. H. WALKLEY

WHEEL

Filed Oct. 25, 1922  2 Sheets-Sheet 2

Inventor
Frank H. Walkley,
By Toulmin & Toulmin
Attorneys

Patented Jan. 29, 1924.

1,482,168

UNITED STATES PATENT OFFICE.

FRANK H. WALKLEY, OF DAYTON, OHIO, ASSIGNOR TO THE DAYTON STEEL FOUNDRY COMPANY, OF DAYTON, OHIO, A CORPORATION OF OHIO.

WHEEL.

Application filed October 25, 1922. Serial No. 596,714.

*To all whom it may concern:*

Be it known that I, FRANK H. WALKLEY, a citizen of the United States, residing at Dayton, in the county of Montgomery and State of Ohio, have invented certain new and useful Improvements in Wheels, of which the following is a specification, reference being had therein to the accompanying drawing.

My invention relates to wheels and in particular to wheels carrying demountable rims.

It is the object of my invention to provide a means of attaching and locking demountable rims upon wheels, of such a character as to insure positive locking, with a minimum number of locking means.

It is the further object to provide a simple construction which will eliminate a large number of clamping means now used in the art in clamping demountable rims on wheels while at the same time securing the same advantage of a plurality of clamping points which is now found in the complicated structures of the present art.

It is my object to provide a new demountable rim clamp, having multiple bearing points which will equalize the strain on the wheel and rim, positively lock the wheel and rim to one another and provide a means that may be simply attached and positively alined when being mounted to prevent the necessity for delicate adjustment in demounting and locking demountable rims upon wheels.

It is an additional object of my invention to provide a clamp which cannot twist or work upon the supporting surface of the wheel.

Referring to the drawings.

Figure 1:
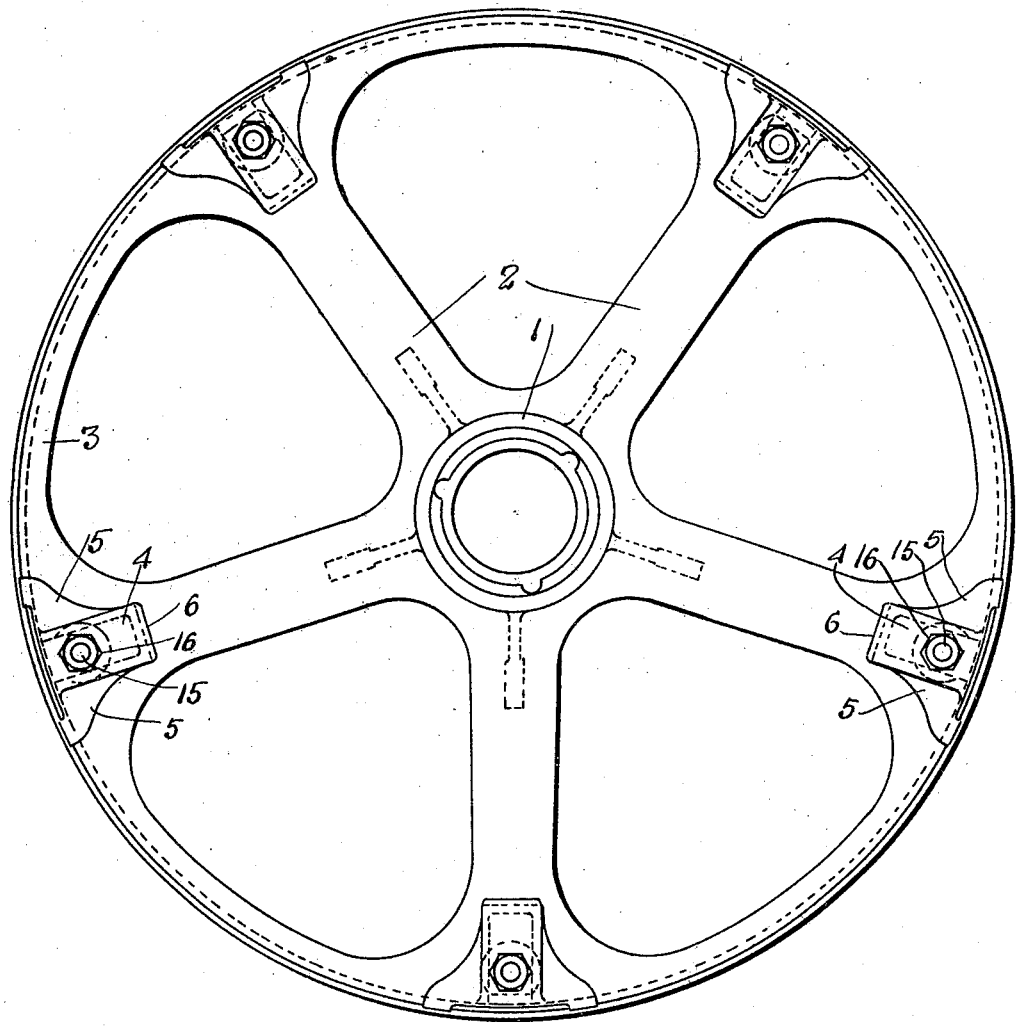
Figure 1 is a side elevation of a wheel showing the clamps, their location and number.
Figure 2:
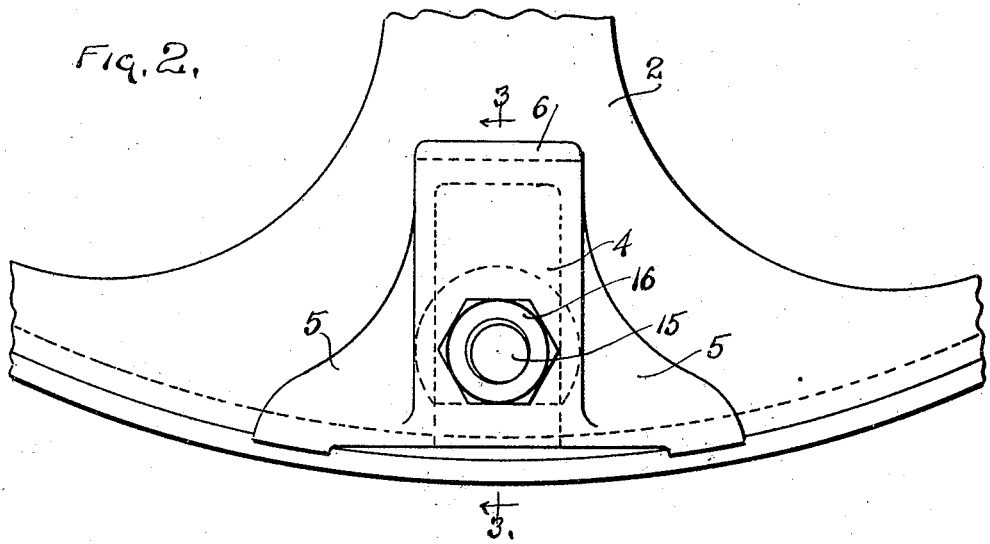
Figure 2 is an enlarged view in elevation of one of the clamps mounted upon a side of the wheel.
Figure 3:
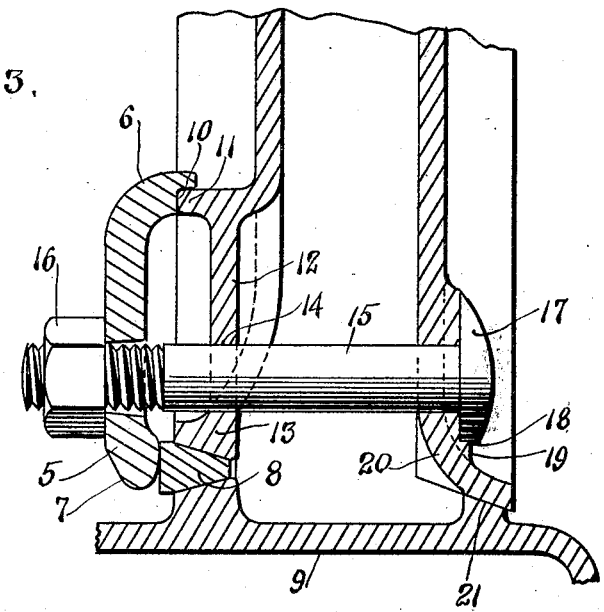
Figure 3 is a section on the line 3—3 of Figure 2, with the retaining bolt and nut in full lines.

Referring to the drawings in detail:

1 is a hub carrying a plurality of spokes 2 which merge into a wheel rim 3. Five spokes are provided, and upon the outer ends and outer surfaces of each of these spokes, there are mounted the retaining clamps 4. This clamp has a pair of outwardly extending arms 5, and an upwardly extending portion 6, so that the entire clamp is somewhat T-shaped. The portions 5 have contact feet 7 for engaging with the locking ring 8, which locks the demountable rim 9 to the wheel. The inner surface of the portion 6 of the clamp, as at 10, is cut away to form a shoulder for engaging with a projecting boss 11 on the spoke end. This supporting portion, or shoulder, is connected by the vertical wall 12 with the outer edge 13 of the wheel rim. The vertical wall 12 is provided with an aperture 14 through which the retaining bolt 15 passes. The bolt 15 carries a locking nut 16 and a head 17. This head 17 is circular save at one side it is flattened, which is designated 18. This flattened side engages with a shoulder 19 on the inner spoke wall 20 on the outside of the wall. This prevents the bolt from rotating. The inner spoke wall merges into the wheel rim as at 21, for supporting the demountable rim 9.

The vertical wall 12 is only used a short distance laterally in order to form a supporting and bracing wall for the shoulder 11, in order to bring that shoulder to such an elevation that the clamp 4 will be substantially in the vertical, thus providing an equal clamping action on the ring 8 by the parts of the clamp 4.

It will be observed that by reason of the broadly separated ends of the arms 5, there are provided with five clamps, 10 clamping points. In a wheel that would ordinarily have 10 clamps to secure 10 clamping points, I am enabled to provide only 5 clamps with only 5 bolts and nuts for adjustment. This not only greatly simplifies the attachment of the demountable rim on a wheel, but reduces the cost. It secures the same result of a multiple of clamping points.

In addition, it is possible to confine the clamps to the spoke ends where there is the greatest strength and the best location for the mounting of the clamps without weakening the wheel. This is especially true of wheels such as shown herein, which are preferably made of cast steel, in which the walls are very thin in order to produce the requisite lightness and still have the necessary strength.

It will be understood that I do not desire to be confined to the details of my invention, but comprehend within it suitable modifications within the scope of my claims which may be found convenient in adapting my invention to varying conditions.

Having thus fully described my invention, what I claim as new and desire to secure by Letters Patent, is:—

1. In combination, in a wheel, wheel spokes and rim, a plurality of bolts passing through the free ends of each of said spokes, supporting shoulders adjacent ends of said spokes, three point clamps carried by said bolts, a locking ring, one portion of said clamps engaging with the shoulder on the spoke and the other portions of which engage with said locking ring carried on one wall of the spokes, and a demountable rim engaging therewith and with the inner wall of the spokes.

2. In combination with a wheel, wheel spokes and a rim, bolts passing through the free ends of said spokes, supporting shoulders adjacent the ends of said spokes, three point clamps carried by said bolts, a locking ring, one portion of which engages with the shoulders on the spoke and the other portions of which engage with a locking ring carried on one wall of the spokes, and a demountable rim engaging therewith and with the inner wall of the spoke and means to prevent the turning of said bolts about their own axes.

3. In combination in a wheel, spokes, a transversely located shoulder adjacent the outer end of each of said spokes on one face thereof, a locking ring, a clamp having a cutaway portion for engaging with said shoulder on each of said spokes, spaced feet on said clamps adapted to engage with said locking ring, supporting surfaces on the outer ends of the spokes for engaging with a locking ring, a demountable rim adapted to engage with one of the outer ends of said spokes and with the locking ring, and means passing through said spokes and clamps for locking the separate parts to one another.

4. In combination in a wheel, spokes, shoulders spaced from, but adjacent the outer ends of the spokes, said shoulders being substantially on a level with the outer edges of the rim of the wheel, means of connecting said shoulders with the outer rim of the wheel, said means being substantially parallel to the axis of the spokes, arched clamps having clamping shoulders cut away on one edge thereof for engagement with said shoulders first mentioned, a pair of spaced feet oppositely disposed on each of said clamps for engaging with the locking ring, an aperture through each of said clamps, bolts passing through said apertures for carrying nuts in engagement with the clamp and for locking the locking ring and spokes to one another, and a demountable rim carried by said locking ring and outer spoke ends, said outer spoke ends having outwardly flaring ends.

5. In combination, in a wheel having a hub and spokes with outwardly flaring ends merging into a rim, a shoulder on each spoke, spaced from the rim and located transversely of the main axis of the spoke, walls connecting each of said shoulders with the rim, parallel to the main axis of the spoke, an arch shaped three point clamp having one point engaging with its shoulder and the other points spaced from one another engaging with the locking ring, a locking ring and a demountable rim locked on the wheel thereby.

6. In a wheel, a plurality of spaced spokes and a rim, and a three point clamp located on the side of the outer end of each spoke, one point of the clamp engaging the spoke, and the other points a curved structure carried by the rim of the wheel at spaced points thereon, said clamps having means to retain them on said spokes.

In testimony whereof, I affix my signature.

FRANK H. WALKLEY.